United States Patent [19]

Matsui et al.

[11] Patent Number: 4,543,346
[45] Date of Patent: Sep. 24, 1985

[54] POLYCRYSTALLINE TRANSPARENT SPINEL SINTERED BODY AND METHOD OF PRODUCING THE SAME

[75] Inventors: Minoru Matsui; Tomonori Takahashi, both of Nagoya, Japan

[73] Assignee: NGK Insulators, Ltd., Japan

[21] Appl. No.: 498,576

[22] Filed: May 26, 1983

[30] Foreign Application Priority Data

Dec. 27, 1982 [JP] Japan .............................. 57-232545

[51] Int. Cl.$^4$ .............................................. C04B 35/44
[52] U.S. Cl. ................................... 501/120; 423/600; 501/153
[58] Field of Search .................. 501/120, 153; 423/600

[56] References Cited

U.S. PATENT DOCUMENTS 3,212,401 10/1965 Navias .................................. 423/600
4,273,587 6/1981 Oda et al. ............................ 423/600

*Primary Examiner*—Mark L. Bell
*Attorney, Agent, or Firm*—Parkhurst & Oliff

[57] ABSTRACT

The disclosed polycrystalline transparent sintered body contains $Al_2O_3$ and $MgO$ at a molar ratio of (0.54:0.46) to (0.58:0.42) and has an in-line transmittance of more than 77% for 1 mm thickness at a light wavelength of 0.6 $\mu$m, which sintered body is produced by preparing fine spinel powder through hydrolysis of an isopropanol solution of aluminum isopropoxide and magnesium isopropoxide, forming a shaped body from the powder, and sintering the shaped body.

9 Claims, 1 Drawing Figure

POLYCRYSTALLINE TRANSPARENT SPINEL SINTERED BODY AND METHOD OF PRODUCING THE SAME

BACKGROUND OF THE INVENTION

1. Field of the Invention

This invention relates to polycrystalline transparent spinel sintered body and a method of producing the same.

2. Description of the Prior Art

It is known that spinel oxides containing $Al_2O_3$ and MgO have a crystal structure corresponding to the cubic system and they are free from double refraction, and that when a polycrystalline spinel sintered body is formed therefrom, no light scattering occurs at grain boundaries. Therefore, if the amounts of impurities and pores therein are kept low, a polycrystalline transparent spinel sintered body having a high in-line transmittance can be obtained by using spinel oxides. Three types of polycrystalline transparent spinel sintered bodies of the prior art are known, namely:

(1) a sintered body consisting of $Al_2O_3$ and MgO at a molar ratio 0.50:0.50 (to be referred to as the "equimolar composition", hereinafter);

(2) a sintered body containing MgO in excess of the equimolar composition; and (3) a sintered body made by adding one or more sintering aids, such as calcium oxide (CaO) and lithium fluoride (LiF).

The above-mentioned sintered body (1) with the equimolar composition has a shortcoming in that when it is made under non-pressurized conditions it is not dense and its transmittance is low, so that in order to obtain a transparent sintered body, sintering at an elevated pressure, i.e., hot pressing, is necessary. This results in a comparatively low productivity and a high cost. The sintered body (2) containing MgO in excess of the equimolar composition has a shortcoming in that it is difficult to combine the excess MgO in the spinel in the form of a solid solution but tends to form residual second phase therein, resulting in a low transmittance of light. The sintered body (3) with the sintering aid has a shortcoming in that the sintering aid also tends to form a residual second phase in the sintered body so as to reduce the transmittance thereof.

SUMMARY OF THE INVENTION

Therefore, an object of the present invention is to obviate the above-mentioned shortcomings of the polycrystalline transparent spinel sintered body of the prior art by providing an improved polycrystalline transparent spinel sintered body.

A preferred embodiment of the polycrystalline transparent spinel sintered body according to the present invention contains $Al_2O_3$ and MgO at a molar ratio of (0.54:0.46) to (0.58:0.42), and has an in-line transmittance of more than 77% for 1 mm thickness thereof at a light wavelength of 0.6 $\mu$m.

Another object of the invention is to provide a method of producing the polycrystalline transparent spinel sintered body of the above-mentioned type.

In a method of producing a polycrystalline transparent spinel sintered body according to the present invention, an isopropanol solution of aluminum isopropoxide and magnesium isopropoxide is prepared for generating precipitates by hydrolysis of the isopropanol solution, and the precipitates are heated so as to form fine spinel powder consisting of $Al_2O_3$ and MgO at a molar ratio of (0.502:0.498) to (0.524:0.476), so that a shaped body is formed of the powder and the shaped body is fired at a temperature not lower than 1,700° C. in hydrogen.

In a preferred embodiment of the method of the invention, the above-mentioned heating of the precipitates to form the fine spinel powder is effected at a temperature of 900°–1,100° C., and the above-mentioned firing at 1,700° C. occurs for more than 10 hours.

The polycrystalline transparent spinel sintered body according to the present invention is formed from a spinel solid solution of a single phase consisting of $Al_2O_3$ and MgO with an $Al_2O_3$ concentration which is slightly higher than that of the above-mentioned equimolar composition, so that the spinel sintered body is substantially free from voids, and no scattering of light results and a very high in-line transmittance of light is occurs. Here, the in-line transmittance refers to a ratio of intensity the transmitted portion of incident light to the intensity of the incident light, wherein the intensity of the transmitted portion of the incident light is taken on a direction which is parallel to the optical axis of the incident light on the object concerned.

BRIEF DESCRIPTION OF THE DRAWING

For a better understanding of the invention, reference is made to the single accompanying drawing FIG. 1, which is a graph showing the in-line transmission of a polycrystalline transparent spinel sintered body according to the present invention, as compared with that of the prior art.

DESCRIPTION OF THE PREFERRED EMBODIMENTS

Figure 1:
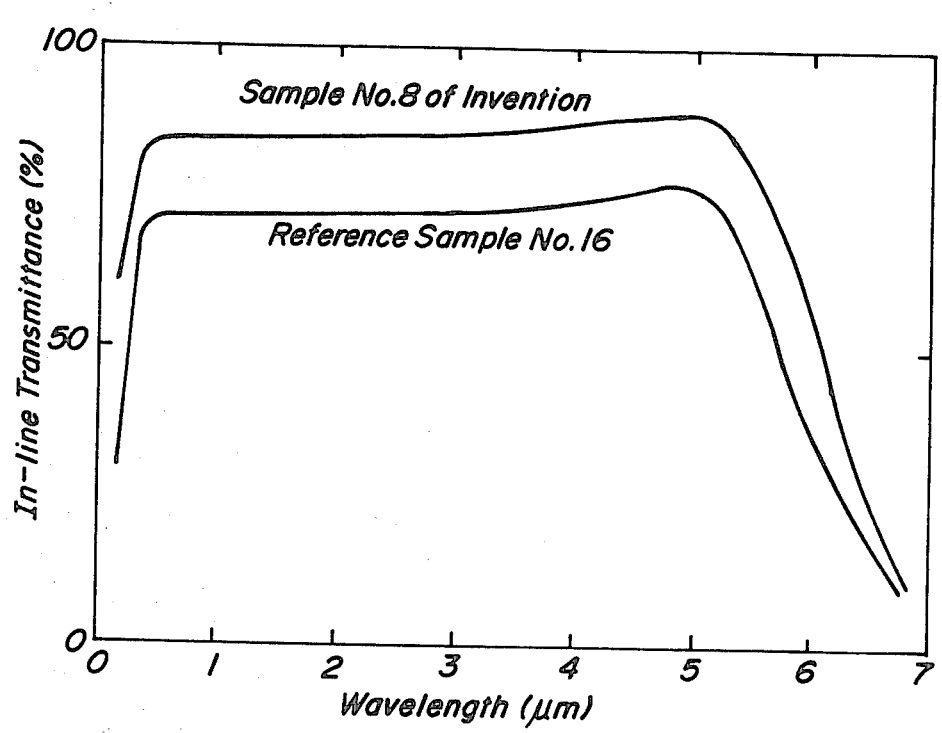

A method of producing polycrystalline transparent spinel sintered body of the invention will be described in detail. Aluminum isopropoxide having a molecular formula $Al(i\text{-}OC_3H_7)_3$ and magnesium isopropoxide having a molecular formula $Mg(i\text{-}OC_3H_7)_2$ are dissolved in isopropanol under heated and refluxed conditions. The aluminum isopropoxide can be made by a reaction between metallic aluminum and isopropanol, while the magnesium isopropoxide can be made by a reaction between metallic magnesium and isopropanol.

In the invention, the concentrations of aluminum isopropoxide and magnesium isopropoxide in the isopropanol solution are adjusted at such levels that one can obtain fine spinel powder containing $Al_2O_3$ and MgO at a molar ratio of (0.502:0.498) to (0.524:0.476). The preparation of the isopropanol solution is not limited to the above-mentioned dissolution of presynthesized aluminum isopropoxide and magnesium isopropoxide. In fact, the isopropanol solution can be prepared by adding either a combination of metallic aluminum with magnesium isopropoxide or a combination of metallic magnesium with aluminum isopropoxide into isopropanol, so as to simultaneously effect the synthesis of either isopropoxide and dissolution of the isopropoxides by heating and refluxing the isopropanol solution.

In the latter case of dissolving the above-mentioned combination, the non-reacted or non-dissolved portions of the added materials tend to remain in the isopropanol solution as residuals, and the concentrations of aluminum isopropoxide and magnesium isopropoxide in the isopropanol solution cannot be determined by calculation, so that the concentrations of aluminum isopropoxide and magnesium isopropoxide in the isopropanol solution are measured and controlled at a ratio corresponding to the desired molar ratio between $Al_2O_3$ and MgO. The control may be carried out by adding a known concentration solution.

Hydrolysis of the thus prepared isopropanol solution of aluminum isopropoxide and magnesium isopropoxide is effected by adding water therein, heating the solution, preferably at a temperature equivalent to or in the proximity of the boiling point of isopropanol, and refluxing the solution through a suitable refluxing means. The following formulae describe the chemical reactions of the hydrolysis.

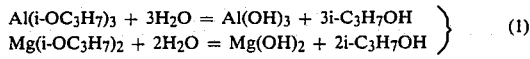

$$\left. \begin{array}{l} Al(i\text{-}OC_3H_7)_3 + 3H_2O = Al(OH)_3 + 3i\text{-}C_3H_7OH \\ Mg(i\text{-}OC_3H_7)_2 + 2H_2O = Mg(OH)_2 + 2i\text{-}C_3H_7OH \end{array} \right\} \quad (1)$$

As can be seen from the formulae (1), the preferred amount of water for the hydrolysis is the sum of an amount corresponding to three times the moles of the aluminum isopropoxide and an amount corresponding to two times the moles of the magnesium isopropoxide. If the amount of water added to effect the hydrolysis exceeds the abovementioned preferred amount, the hydroxides produced tend to dissolve in the excess water. On the other hand, if the amount of water added to effect the hydrolysis has less than the above-mentioned preferred amount, a part of the aluminum and magnesium components remains as non-precipitating material without being decomposed by the hydrolysis. Accordingly, if the amount of water added to effect the hydrolysis deviates from the above-mentioned preferred amount, the concentrations of $Al_2O_3$ and MgO in the fine spinel powder tend to be different from the desired molar ratio despite the precalculated adjustment of the concentrations of the aluminium isopropoxide and magnesium isopropoxide in the isopropanol solution.

It is preferable to dilute the water for hydrolysis by mixing it with more than ten times of isopropanol before adding it to the isopropanol solution, to prevent formation of any localized excessively water-rich portions and to generate uniform precipitations of hydroxides.

With lithium fluoride (LiF) is used as a sintering aid, it is difficult to uniformly mix the sintering aid with the spinel powder by a ball mill or the like, and unless the sintering aid is uniformly mixed, homogeneously sintered bodies cannot be produced. It has been found to be preferable to dissolve lithium fluoride (LiF) in the water for hydrolysis and to dilute the aqueous solution of lithium fluoride (LiF) with isopropanol before adding it to the isopropanol solution for effecting the hydrolysis, because fine spinel powder with lithium fluoride (LiF) uniformly dispersed therein can be obtained thereby. When the fine spinel powder with lithium fluoride (LiF) added therein is used as the powder for the spinel sintered body, the material being sintered is uniformly densified, and a spinel sintered body having homogeneity is produced.

The hydroxide precipitates generated by the hydrolysis are separated from isopropanol by filtering or the like, and the separated precipitates are dried and heated to crystallize them. Preferably, the precipitates are dried at a temperature not higher than 120° C., because if the drying temperature is higher than 120° C., isopropanol adhering to the oxide precipitates is carbonized and the carbon thus formed remains in the fine spinel powder as a detrimental impurity.

Heating of the hydroxide precipitates is preferably effected in an oxidizing atmosphere at a temperature in a range of 900°–1,100° C. If the oxidizing atmosphere is not used, the isopropanol adhering to the hydroxide precipitates is carbonized and carbon thus formed tends to remain in the fine spinel powder as a detrimental impurity. The carbon contained in the fine spinel powder remains even in the spinel sintered body and tends to hinder the densification and reduce the transmittance of the body. The hydroxide precipitates just dried are of non-crystal structure, and such hydroxide precipitates can be completely dehydrated at 500° C. and the spinel crystallization occur at 700° C. However, if the heating for the crystallization is effected at a temperature below 900° C., the spinel powder formed is so small that it is difficult to pack, so that the density of the shaped body becomes very low. On the other hand, if the temperature of heating for the crystallization is higher than 1,100° C., the powder grows and retains activeness. Thus, when the crystallizing temperature falls outside the range of 900°–1,100° C., sufficient densification cannot be effected, and it becomes very difficult to obtain a fine spinel powder which is suitable for the production of a polycrystalline transparent spinel sintered body.

With the method of the present invention, the molar concentration ratio between $Al_2O_3$ and MgO in the fine spinel powder thus dried and crystallized is preferably in a range of (0.502:0.498) to (0.524:0.476), as pointed out above. Any fine spinel powder with a composition which falls outside the above-mentioned range of the molar concentration ratio has been found to be unsuitable for causing sufficient densification and producing a spinel sintered body with a high transmittance.

The fine spinel powder thus prepared is crushed preferably by a ball mill and sifted by a screen of 60 mesh. A shaped body of a desired configuration is formed by the spinel powder thus sifted. The shaped body is fired in hydrogen at a temperature higher than 1,700° C., preferably for more than 10 hours. The temperature for the firing is raised at a rate of less than 50° C./hour in a range above 800° C. It should be noted here that, when the temperature increases above 1,400° C., a part of MgO in the spinel powder vaporizes and the molar concentration ratio between $Al_2O_3$ and MgO in the spinel sintered body being fired gradually deviates from that in the fine spinel powder before firing. In the present invention, it is very important to achieve the molar concentration ratio between $Al_2O_3$ and MgO of (0.54:0.46) to (0.58:0.42) in the spinel sintered body after firing. To this end, it is particularly important to form a sufficiently dense spinel sintered body in a temperature range of below 1,400° C. If a spinel sintered body which is not dense is fired at a temperature higher than 1,400° C., the evaporation of MgO is too fast, and the content of $Al_2O_3$ exceeds that for the maximum molar concentration ratio between $Al_2O_3$ and MgO of (0.58:0.42), so that corundum precipitates as a second phase for causing light to scatter and reducing the light transmittance of the spinel sintered body. On the other hand, to have a spinel sintered body with a high transmittance, it is better to vaporize more than 10% of MgO contained in the fine spinel powder than to completely suppress the vaporization of the MgO. The vaporization of MgO can be controlled by placing the shaped body in a vessel made of tungsten, molybdenum, or the like.

Preferably, the firing of the shaped body is carried out in hydrogen, because firing in air or nitrogen ($N_2$) tends to trap nitrogen ($N_2$) in the pores of the shaped body being fired, so that the pores thus holding nitrogen ($N_2$) become hard to eliminate. On the other hand, firing in avacum tends to cause excessive vaporization of MgO, and the content of $Al_2O_3$ exceeds that for the maximum molar concentration ratio between $Al_2O_3$ and MgO of (0.58:0.42). Therefore, corundum precipitates as a second phase, and both of the above-mentioned pores and the corundum thus precipitated tend to cause scattering of light and reduce the transmittance of the spinel sintered body.

In the above-mentioned method of the invention, lithium fluoride (LiF) may be added as a sintering aid. The addition of lithium fluoride (LiF) in the fine spinel powder tends to accelerate the densification of the shaped body at comparatively low temperatures. Thus, the rate of temperature rise at temperatures below 1,400° C. for the firing of the shaped body can be increased to 100° C./hour, while ensuring the production of a polycrystalline transparent spinel sintered body having a high transmittance. The preferable concentration of the sintering aid lithium fluoride (LiF) is 0.05–0.15% by weight. If the amount of the sintering aid is less than 0.05% by weight, the addition of lithium fluoride (LiF) does not cause the desired effects, while if more than 0.15% by weight of the sintering aid is used, the excess lithium fluoride (LiF) tends to remain as a second phase in the spinel sintered body, so as to cause scattering of light and reducing the transmittance. As long as the addition of lithium fluoride (LiF) is less than 0.15% by weight, the added lithium fluoride (LiF) vaporizes during the high-temperature firing, and only about 0.01% by weight thereof will remain in the spinel sintered body.

The polycrystalline transparent spinel sintered body thus produced by the above-mentioned method is sliced into planar specimens, and the opposite surfaces of each specimen are ground into parallel mirror surfaces. Measurements with such specimens proved that the in-line transmittance of light of the polycrystalline transparent spinel sintered body of the invention was more than 77% at a light wavelength of 0.6 $\mu$m for a thickness of 1 mm, the transmittance for 1 mm thickness being obtained by conversion of the measured values.

The invention will be described in further detail now by referring to examples.

EXAMPLE 1

Samples of fine spinel powder with molar concentration ratios between $Al_2O_3$ and MgO as listed in Table 1 were prepared by dissolving precalculated amounts of aluminum isopropoxide and magnesium isopropoxide for each sample in an isopropanol solution so as to produce a predetermined concentration ratio of the ingredients in the isopropanol solution, heating the isopropanol solution at a temperature in the proximity of the boiling point of isopropanol while using a suitable refluxing device so as to cause hydrolysis of the isopropanol solution, separating precipitates generated by the hydrolysis through filtering, and heating the precipitates at 1,000° C. The fine spinel powder thus prepared showed spinel diffraction patterns when being tested by X-ray powder diffraction, and the specific surface area thereof was found to be 40–70 $m^2/g$. The fine spinel powder was crushed for 24 hours through a wet process by using alumina balls, dried in air at 90°–110° C. for 24 hours, and sifted by passing them through a 60 mesh screen. The sifted powder was preformed by a die, pressed by a hydrostatic pressure of 2,500 kg/$cm^2$, and fired in a hydrogen atmosphere under the conditions listed in Table 1. Whereby, Samples No. 1 through No. 9 of the polycrystalline transparent spinel sintered body according to the present invention were produced.

Fine spinel powder with lithium fluoride (LiF) uniformly dispersed therein were prepared by using an aqueous solution of lithium fluoride (LiF) in the hydrolysis of aluminum isopropoxide and magnesium isopropoxide while following similar steps to those of the above-mentioned samples. Samples No. 10 through No. 14 of the polycrystalline transparent spinel sintered body containing lithium fluoride (LiF) were produced by sintering the thus prepared spinel powder with lithium fluoride (LiF) under the conditions listed in Table 1.

Reference Samples No. 15 through No. 21 of spinel sintered body were produced by using manufacturing conditions outside the numerical limitations of the present invention, as shown in Table 1.

Each of the spinel sintered body samples thus produced were sliced into test pieces, and the opposite surfaces of each test piece were ground into parallel mirror surfaces. In-line transmittance of the test pieces were measured at wavelengths of 0.6 $\mu$m and 5 $\mu$m, and the measured values were converted into values for the sintered body thickness of 1 mm for comparison. The results of the comparison are shown in Table 1.

The variation of the in-line transmittance with 1 mm thickness of the sintered body at different wavelengths ranging from visible rays to infrared rays is shown in FIG. 1, for Sample No. 8 of the sintered body of the invention and Reference Sample No. 16.

TABLE 1

| Sample No. | Composition of spinel powder (molar ratio) $Al_2O_3$:MgO | Sintering conditions Rate of temperature rise within a range of 800–1,400° C. (°C./h) | Rate of temperature rise at a temperature above 1,400° C. (°C./h) | Temperature (°C.) | Duration (h) | Composition of sintered body (molar ratio) $Al_2O_3$:MgO | In-line transmittance (%) At wavelength 0.6 $\mu$m | At wavelength 5 $\mu$m | LiF concentration (wt %) Spinel powder | Sintered body |
|---|---|---|---|---|---|---|---|---|---|---|
| Invention 1 | 0.503:0.497 | 20 | 33 | 1,800 | 20 | 0.550:0.450 | 81 | 86 | | |
| 2 | 0.503:0.497 | 50 | 50 | 1,800 | 20 | 0.545:0.455 | 80 | 86 | | |
| 3 | 0.517:0.483 | 20 | 33 | 1,700 | 20 | 0.539:0.461 | 77 | 83 | | |
| 4 | 0.517:0.483 | 20 | 33 | 1,800 | 10 | 0.545:0.455 | 77 | 84 | | |
| 5 | 0.517:0.483 | 20 | 33 | 1,800 | 20 | 0.563:0.437 | 82 | 86 | | |
| 6 | 0.517:0.483 | 50 | 50 | 1,800 | 20 | 0.560:0.440 | 80 | 86 | | |
| 7 | 0.524:0.476 | 20 | 33 | 1,800 | 10 | 0.546:0.454 | 77 | 82 | | |
| 8 | 0.524:0.476 | 20 | 33 | 1,800 | 20 | 0.578:0.422 | 84 | 89 | | |
| 9 | 0.524:0.476 | 50 | 50 | 1,800 | 20 | 0.569:0.431 | 79 | 84 | | |
| 10 | 0.509:0.491 | 100 | 100 | 1,800 | 20 | 0.549:0.451 | 77 | 82 | 0.07 | <0.01 |

TABLE 1-continued

| | | Sintering conditions | | | | | In-line transmittance (%) | | LiF concentration (wt %) | |
|---|---|---|---|---|---|---|---|---|---|---|
| Sample No. | Composition of spinel powder (molar ratio) Al$_2$O$_3$:MgO | Rate of temperature rise within a range of 800–1,400° C. (°C./h) | Rate of temperature rise at a temperature above 1,400° C. (°C./h) | Temperature (°C.) | Duration (h) | Composition of sintered body (molar ratio) Al$_2$O$_3$:MgO | At wavelength 0.6 μm | At wavelength 5 μm | Spinel powder | Sintered body |
| 11 | 0.512:0.488 | 100 | 100 | 1,800 | 20 | 0.558:0.442 | 78 | 84 | 0.07 | <0.01 |
| 12 | 0.518:0.482 | 20 | 33 | 1,800 | 20 | 0.566:0.434 | 84 | 88 | 0.09 | <0.01 |
| 13 | 0.518:0.482 | 100 | 100 | 1,800 | 20 | 0.559:0.441 | 80 | 84 | 0.09 | <0.01 |
| 14 | 0.504:0.496 | 100 | 100 | 1,800 | 20 | 0.543:0.457 | 80 | 85 | 0.13 | <0.01 |
| Reference 15 | 0.503:0.497 | 20 | 33 | 1,800 | 10 | 0.532:0.468 | 76 | 82 | | |
| 16 | 0.501:0.499 | 20 | 33 | 1,800 | 20 | 0.537:0.463 | 72 | 78 | | |
| 17 | 0.527:0.473 | 20 | 33 | 1,800 | 20 | 0.584:0.416 | 71 | 76 | | |
| 18 | 0.517:0.483 | 100 | 100 | 1,800 | 20 | 0.552:0.448 | 68 | 72 | | |
| 19 | 0.524:0.476 | 100 | 100 | 1,800 | 20 | 0.566:0.434 | 65 | 67 | | |
| 20 | 0.517:0.483 | 20 | 33 | 1,800 | 20 | 0.519:0.481 | 42 | 45 | | |
| 21 | 0.517:0.483 | 20 | 33 | 1,800 | 20 | 0.593:0.407 | 18 | 20 | | |

As can be seen from Table 1 and FIG. 1, the polycrystalline transparent spinel sintered body of the present invention has a very high in-line transmittance of more than 77% at a wavelength of 0.6 μm, and it has excellent transparency for a wide range of wavelengths from visible rays to infrared rays. On the other hand, the Reference Samples whose compositions fall outside the scope of present invention have only small in-line transmittance values.

As described in the foregoing, the polycrystalline transparent spinel sintered body has a very high transmittance of light, which is produced by the combined effects of the specific composition of spinel powder and the specific sintering conditions: more specifically, the specific spinel powder composition with an alumina concentration which is larger than that in the equimolar composition, prepared by heating the precipitates generated by hydrolysis of aluminum isopropoxide and magnesium isopropoxide in an isopropanol solution; and the sintering at the specific temperature in a hydrogen atmosphere. The polycrystalline transparent spinel sintered body of the invention is particularly useful as a material for electric discharge tubes, materials passing infrared rays, watch materials, and other optical materials.

Although the invention has been described with a certain degree of particularity, it is understood that the present disclosure has been made only by way of example and that numerous changes in details of conditions and the combination and arrangement of constituent elements may be resorted to without departing from the scope of the invention as hereinafter claimed.

What is claimed is:

1. A polycrystalline transparent spinel sintered body, consisting of Al$_2$O$_3$ and MgO in a ratio of (0.54:0.46) to (0.58:0.42), said sintered body having an in-line transmittance of at least 77% for a 1 mm thickness at a light wavelength of 0.6 μm.

2. A polycrystalline transparent spinel sintered body, consisting of Al$_2$O$_3$ and MgO in a ratio of (0.54:0.46) to (0.58:0.42), said sintered body having an in-line transmittance of at least 77% for a 1 mm thickness at a light wavelength of 0.6 μm made by a method comprising the steps of preparing an isopropanol solution of aluminum isopropoxide and magnesium isopropoxide, generating precipitates by hydrolysis of the isopropanol solution, heating said precipitates to form a fine spinel powder consisting of Al$_2$O$_3$ and MgO in a molar ratio of (0.502:0.498) to (0.524:0.476), shaping a body from said formed powder and firing the shaped body in a hydrogen atmosphere at a temperature higher than 1700° C. to obtain said ratio of Al$_2$O$_3$ and MgO in said sintered body.

3. The spinel sintered body of claim 2, wherein lithium fluoride (LiF) is added to said fine spinel powder to act as a sintering aid.

4. The spinel sintered body of claim 3, wherein 0.05–0.15% by weight of said lithium fluoride (LiF) is added to said fine spinel powder.

5. The spinel sintered body of claim 3, wherein said lithium fluoride (LiF) is dissolved in water and an aqueous solution of lithium fluoride (LiF) is thus prepared and is added to said isopropanol solution.

6. The spinel sintered body of claim 1, wherein said in-line transmittance is at least 80%.

7. The spinel sintered body of claim 2, wherein said in-line transmittance is at least 80%.

8. A polycrystalline transparent spinel sintered body, consisting of Al$_2$O$_3$ and MgO in a ratio of (0.54 : 0.46) to (0.58 : 0.42) and LiF in an amount less than 0.01% by weight, said sintered body having an in-line transmittance of at least 77% for a 1 mm thickness at light wavelength of 0.6 μm.

9. The spinel sintered body of claim 8, wherein said in-line transmittance is at least 80%.

* * * * *